US011092667B2

(12) United States Patent
Harmer et al.

(10) Patent No.: US 11,092,667 B2
(45) Date of Patent: Aug. 17, 2021

(54) PORTABLE APPARATUS FOR VEHICLE SENSOR CALIBRATION

(71) Applicants: Bosch Automotive Service Solutions Inc., Warren, MI (US); Robert Bosch GmbH, Stuttgart (DE)

(72) Inventors: Jeremy Harmer, Austin, MN (US); Dan Newkirk, Owatonona, MN (US); Robert Meitzler, Warren, MI (US)

(73) Assignees: Bosch Automotive Service Solutions Inc., Warren, MI (US); Robert Bosch GmbH, Stuttgart (DE)

(*) Notice: Subject to any disclaimer, the term of this patent is extended or adjusted under 35 U.S.C. 154(b) by 202 days.

(21) Appl. No.: 16/221,101

(22) Filed: Dec. 14, 2018

(65) Prior Publication Data

US 2019/0187249 A1 Jun. 20, 2019

Related U.S. Application Data

(60) Provisional application No. 62/635,621, filed on Feb. 27, 2018, provisional application No. 62/608,170, filed on Dec. 20, 2017.

(51) Int. Cl.
*G01S 7/40* (2006.01)
*F16M 11/04* (2006.01)
*F16M 11/24* (2006.01)
*G01B 11/27* (2006.01)
*G01B 11/275* (2006.01)

(52) U.S. Cl.
CPC .............. *G01S 7/40* (2013.01); *F16M 11/04* (2013.01); *F16M 11/242* (2013.01); *G01B 11/272* (2013.01); *G01B 11/275* (2013.01)

(58) Field of Classification Search
CPC ....... G01S 7/40; G01B 11/275; G01B 11/272; F16M 11/04; F16M 11/242
USPC ......................................................... 342/174
See application file for complete search history.

(56) References Cited

U.S. PATENT DOCUMENTS

| 3,363,504 A | 1/1968 | Lill |
| 4,142,299 A | 3/1979 | Alsina |
| 4,338,027 A | 7/1982 | Eck |
| 5,125,164 A | 6/1992 | Fournier et al. |
| 5,473,931 A | 12/1995 | Brady et al. |
| 6,460,004 B2 | 10/2002 | Greer et al. |
| 6,542,840 B2 | 4/2003 | Okamoto et al. |

(Continued)

FOREIGN PATENT DOCUMENTS

| DE | 102009009046 | 10/2009 |
| EP | 1091186 | 11/2001 |

(Continued)

OTHER PUBLICATIONS

SCT 415 S7, BOSCH, Original Instructions, Calibration and adjustment devices, Aug. 12, 2016, Robert Bosch GmbH.

*Primary Examiner* — Frank J McGue
(74) *Attorney, Agent, or Firm* — David Kovacek; Maginot, Moore & Beck LLP (57) ABSTRACT

An apparatus for calibration of vehicle sensors comprising a target structure and an alignment structure. The target structure comprises a portable arrangement, including a number of folding legs configurable into at least a first position. The target structure is further operable to be reconfigured to accommodate a variety of vehicles having different sensor placements.

17 Claims, 12 Drawing Sheets

(56) References Cited

U.S. PATENT DOCUMENTS

| | | |
|---|---|---|
| 7,237,344 B2 | 7/2007 | Shishikura |
| 9,279,670 B2 | 3/2016 | Schommer et al. |
| 9,794,552 B1 | 10/2017 | Ribble et al. |
| 9,875,557 B2 | 1/2018 | Napier et al. |
| 2008/0173782 A1* | 7/2008 | Stengel ................. A47B 97/08 248/450 |
| 2010/0194886 A1 | 8/2010 | Asari et al. |
| 2015/0049188 A1 | 2/2015 | Harrell et al. |
| 2015/0317781 A1 | 11/2015 | Napier et al. |
| 2017/0003141 A1 | 1/2017 | Voeller et al. |

FOREIGN PATENT DOCUMENTS

| | | | |
|---|---|---|---|
| EP | 2412956 A2 * | 2/2012 | ............. F01N 3/106 |
| EP | 2416139 | 10/2013 | |
| EP | 3412956 * | 12/2018 | ............. F16M 11/24 |
| FR | 3028989 | 11/2014 | |
| WO | 2017016541 | 2/2017 | |

\* cited by examiner

PORTABLE APPARATUS FOR VEHICLE SENSOR CALIBRATION

TECHNICAL FIELD

This disclosure relates to the calibration of sensors, and in particular sensors using radar, optical, or sonic signals disposed within a vehicle for use with an Advanced Driver Assistance System.

BACKGROUND

In vehicles having an Advance Driver Assistance System, the associated sensors require calibration to achieve proper operation. Calibration may be required as part of regular maintenance, or on particular occasions such as the repair or replacement of the windshield or other glass components of the vehicle. Certain vehicular glass repairs may be completed on-site, such as at the vehicle owner's home or place of business. Current calibration tools are typically bulky and stationary, and require the vehicle to be brought into an automotive service center or similar controlled environment.

It is therefore desirable to have a calibration apparatus that is sufficiently mobile that the calibration procedure may be performed at a desired location outside of an automotive service center. It is additionally desirable to make use of such a calibration apparatus to preserve a maximum amount of space in small facilities, and to optimize the existing space of a facility.

SUMMARY

One aspect of this disclosure is directed to a target apparatus for use in a vehicle sensor calibration comprising a base plate with a top surface, a number of position-adjustable legs connected to the base plate and exposed lengthwise in a direction substantially parallel to the top surface when adjusted to a first position, an upright support member extending from the base plate in a direction substantially perpendicular to the top surface, a crossbar member detachably coupled to the upright support member and extending lengthwise in a direction substantially perpendicular to the upright support member when coupled, and a number of reflective surfaces detachably coupled to the crossbar member.

In another aspect of the disclosure, the target apparatus may exhibit radial symmetry of the number of position-adjustable legs in a direction substantially perpendicular to the top surface Another aspect of this disclosure is directed to a target apparatus for use in a vehicle sensor calibration comprising a base plate with a top surface, three position-adjustable legs connected to the base plate and exposed lengthwise in a direction substantially parallel to the top surface when adjusted to a first position, an upright support member extending from the base plate in a direction substantially perpendicular to the top surface, a crossbar member detachably coupled to the upright support member and extending lengthwise in a direction substantially perpendicular to the upright support member when coupled, and a pair of reflective surfaces detachably coupled to the crossbar member.

A further aspect of this disclosure is directed to an optical calibration apparatus comprising a target structure component having position-adjustable legs and detachably coupled reflective surfaces, a number of alignment structure components each having a stability member, an upright extension member extending from the stability member and a number of alignment brackets.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
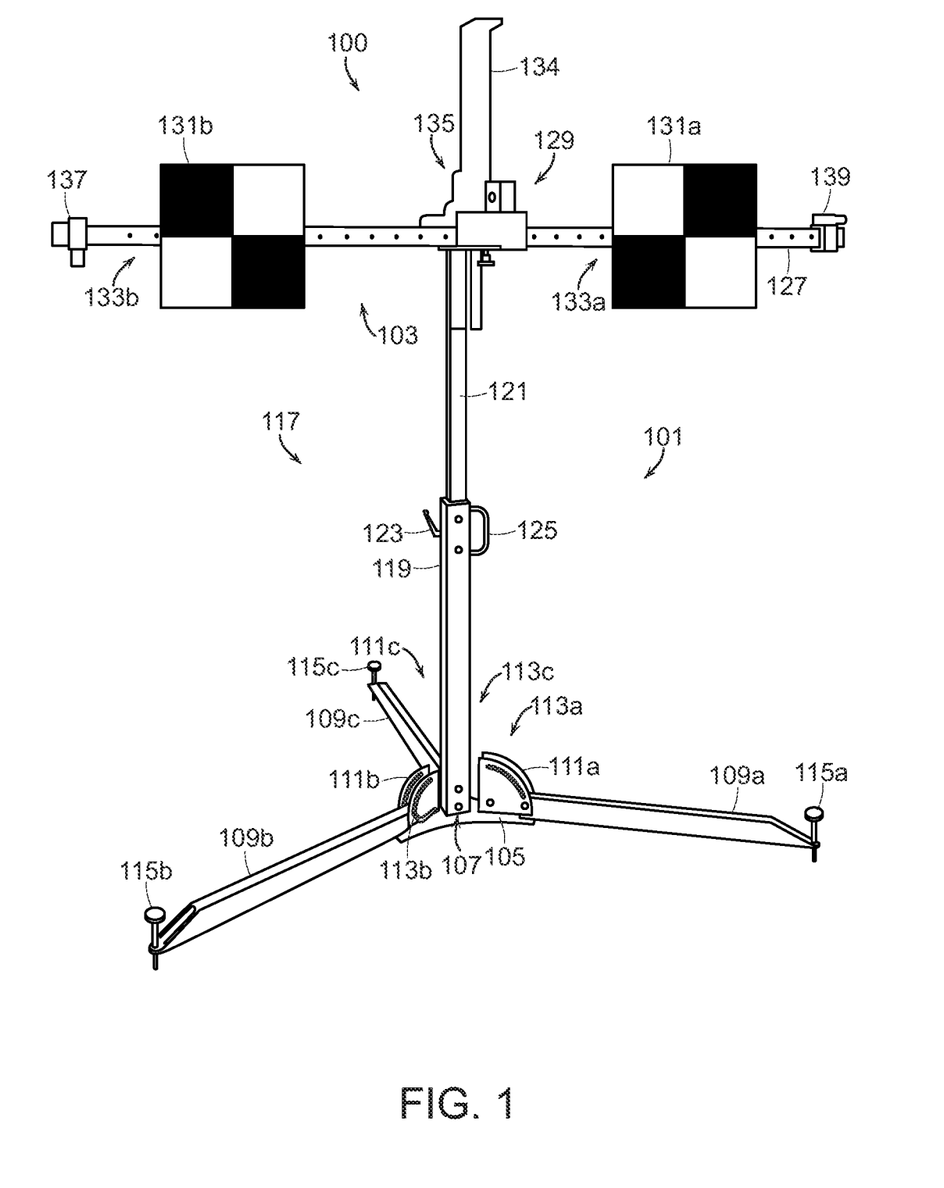
FIG. 1 is a view of a target apparatus for use in vehicle sensor calibration.

FIG. 1 shows a target structure 100 operable for use as part of a vehicle sensor calibration apparatus. Target apparatus 100 provides reflective surfaces to be used during the calibration of vehicle sensors, such as radar sensors, lidar sensors, proximity sensors, cameras, or any other equivalent alternative sensor known to one of ordinary skill in the art. Target apparatus 100 may be placed in a particular location and arrangement during a sensor calibration in order to provide proper placement and angle of the reflective surfaces relative to the sensors. In the depicted embodiment, target apparatus 100 is substantially comprised of a freestanding assembly 101 and a crossbar assembly 103. In the depicted embodiment, crossbar assembly 103 is detachably coupled to freestanding assembly 101. Advantageously, detachable coupling of the crossbar assembly 103 to freestanding assembly 101 may improve the mobility and portability of target apparatus 100. Other embodiments of target apparatus 100 may have other configurations.

Freestanding assembly 101 comprises a base plate member 105 having a top surface 107. Top surface 107 is disposed such that it is substantially parallel to the surface upon which freestanding assembly 101 rests.

Coupled to base plate member 105 are a number of legs 109, each of the number of legs 109 operable to provide stability to target apparatus 100. Legs 109 improve the stability of target structure 100, which is advantageous for use in non-ideal environments such upon uneven surfaces or in windy outdoor conditions. In the depicted embodiment, each of legs 109 is long enough such that the center-of-mass of target structure 100 cannot rest further from the center of target structure 100 than the length of the shortest leg 109 in the course of normal expected operation. In the depicted embodiment, each of legs 109 is the same length, but other embodiments may comprise other configurations.

In the depicted embodiment, each of the number of legs 109 is operable to be adjusted with respect to the base plate member 105 using a corresponding hinge 111. Other embodiments may comprise non-adjustable legs, or other mechanisms for adjustment, such as a telescoping design, folding design, collapsible design, or any other alternative equivalent known to one of ordinary skill in the art. Advantageously, adjustable implementations of legs 109 may increase the mobility and portability of the target apparatus 100. In the depicted embodiment, legs 109 are adjustable such that they may be arranged in at least a first position extending lengthwise from the base plate member 105 in a direction substantially parallel to top surface 107. In the depicted embodiment, each of legs 109 may further be arranged in a second position extending lengthwise from base plate member 105 in a direction substantially perpendicular to top surface 107. In the depicted embodiment, each of legs 109 may further be arranged at any angle between the first position and the second position. In the depicted embodiment, each of legs 109 comprises a leg-angle lock 113 operable to lock its respective leg in its current position. Other embodiments may comprise other configurations having different possible arrangements for legs 109.

Each of legs 109 further comprises a foot 115 operable to finely adjust the height of its respective leg 109 with respect to the surface upon which target apparatus 100 rests. Each of feet 115 is operable to stabilize the positioning of its respective associated leg 109 with respect to the surface upon which target apparatus 100 rests. Advantageously in the depicted embodiment, each of feet 115 may be adjusted independently of the other feet, and thus feet 115 may be used to collectively provide finely-adjusted changes to the upright angle of target apparatus 100. Some embodiments may comprise alternative configurations of feet 115 without deviating from the teachings disclosed herein. In some embodiments, feet 115 may instead comprise static foot structures, rubber pads, wheels, casters, or any other equivalent configuration known to one of ordinary skill in the art. In wheeled embodiments, feet 115 may further comprise height-adjustable or locking wheels. Some embodiment of feet 115 may comprise wheels that are both height-adjustable and locking. Some embodiments of target structure 100 may not comprise feet 115.

Each of legs 109 and their respective associated hinge 111, leg-angle lock 113 and foot 115 are functionally identical in the depicted embodiment. However, each is depicted with additional identifiers (e.g., 109a, 109b, 109c) in order to clarify the drawings herein. Leg 109a is associated with hinge 111a, leg-angle lock 113a and foot 115a, all of which are functionally identical to the respective components associated with leg 109b and leg 109c. Similarly, leg 109b is associated with hinge 111b, leg-angle lock 113b, and foot 115b. Similarly, leg 109c is associated with hinge 111c, leg-angle lock 113c, and foot 115c. With respect to the drawings herein, these distinctions are directed to the orientation and arrangement of legs 109 with respect to the rest of target apparatus 100. Other embodiments may comprise non-identical configurations of legs 109.

In the depicted embodiment, there are three of legs 109, but other embodiments may comprise other numbers of legs, such as four or more. In the depicted embodiment, legs 109 are disposed about freestanding assembly 101 such that when each of legs 109 is placed in the first position (as depicted in FIG. 1), they collective exhibit radial symmetry about a direction substantially perpendicular to top surface 107. In the depicted embodiment, legs 109 exhibit third-order radial symmetry, but other embodiments may comprise differently-ordered radial symmetry or no radial symmetry at all without deviating from the teachings disclosed herein. Some embodiments in particular may comprise a number of legs N, exhibiting N-order radial symmetry about a direction substantially perpendicular to top surface 107.

Coupled to base plate member 105 is an upright support member 117, extending away from base plate member 105 in a direction substantially perpendicular to top surface. In the depicted embodiment, upright support member 117 comprises a fixed support member 119 and an extensible support member 121, but other embodiments may comprise other configurations without deviating from the teachings herein. In the depicted embodiment, upright support member 117 extends substantially perpendicular to top surface 107 in a substantially vertical direction. Extensible support member 121 may further extend the upright support member 117 in the substantially vertical direction. Advantageously, this additional extension of upright support member 117 may permit configuration of target structure 100 that is compatible with a wider variety of vehicles than if upright support member 117 comprised only fixed support member 119. In the depicted embodiment, extensible support member 121 extends using a telescoping mechanism, though other embodiments may comprise a folding mechanism, collapsing mechanism, a threaded-spindle mechanism, or any other extension mechanism known to one of ordinary skill in the art without deviating from the teachings disclosed herein.

The extension of extensible support member 123 may be held in position by an upright-extension lock 123. In the depicted embodiment, upright-extension lock 123 comprises a screw lock, but other embodiments may comprise other configurations such as a clamp lock, set pin, ratchet lock, or any other configuration known to one of ordinary skill in the art.

Freestanding assembly 101 may further comprise one or more handles 125 operable to provide a user a gripping point when configuring or moving freestanding assembly 101 or the entire target structure 100 when fully assembled. In the depicted embodiment, target structure 100 comprises a single handle 125 coupled to fixed support member 119, but other embodiments may comprise other configurations having different locations for handle 125. Some embodiments may comprise a different number of handles 125 having different locations useful to ease reconfiguration or mobility of target structure 100. Some embodiments may not comprise handle 125.

Detachably coupled to freestanding assembly 101 is the crossbar assembly 103. Crossbar assembly 103 comprises a crossbar member 127 and detachably couples to the freestanding assembly 101 using a crossbar-coupling mechanism 129. When coupled, crossbar member 127 extends away from upright support member 117 in opposite directions, each direction substantially parallel to top surface 107.

A number of reflectors 131 are detachably coupled to crossbar member 427, the detachable coupling using a reflector-coupling mechanism 133. Reflectors 131 provide reflective surfaces usable by vehicle sensors during a calibration procedure. The depicted embodiment comprises two reflectors 131, but other embodiments may comprise a different number of reflectors without deviating from the teachings disclosed herein. In the depicted embodiment, reflectors 131 are detachable from crossbar member 127 and may thus be replaced with alternative configurations of reflectors 131. Advantageously, this permits target structure 100 to be utilized for a wider variety of vehicles having different specifications for calibration. In the depicted embodiment, target structure 100 further comprises a reflector clasp 134 operable to reinforce a reflector-coupling mechanism 133 by providing additional stability and support for particularly large configurations of reflector 131. In the depicted embodiment, utilization of reflector clasp 134 is optionally used only with appropriate configurations of reflector 131. In the depicted embodiment, reflector clasp 134 extends in a substantially vertical direction away from crossbar assembly 103, but other embodiments may comprise other configurations of reflector clasp 134 without deviating from the teachings disclosed herein. Some embodiments may not comprise reflector clasp 134.

During calibration of a vehicle's sensors, the position and angle of the reflectors 131 in relation to the sensors is a factor to be considered in achieving a successful calibration. Different vehicles may have different locations thereof where the sensors are disposed. Target structure 100 comprises a number of functions usable to adjust the position of the reflectors 131 such that the target structure 100 may advantageously be used to calibrate sensors in a variety of vehicles having different sensor arrangements. As previously mentioned, extensible support member 121 is operable to extend in a substantially vertical direction. Because crossbar assembly 103 is detachably coupled to the upright support member 117, crossbar assembly 103 may be operably adjusted when extensible support member 121 is adjusted. The adjustments of extensible support member 121 may be coarse, and thus crossbar member 127 may comprise a height-adjustment mechanism 135 operable for more precise adjustment of vertical height of crossbar member 127. This adjusts the height of reflectors 131 while coupled to crossbar member 127. The crossbar-coupling mechanism 129 may further comprise adjustment functions, such as adjustments in the pitch, yaw, or tilt of crossbar member 127, which correspondingly adjusts the positions of each of reflectors 131 when coupled to crossbar member 127. In the depicted embodiment, crossbar-coupling mechanisms 129 may be adjustably-disposed along the length of crossbar member 127, and in such embodiments each of reflectors 131 may be correspondingly disposed. Some embodiments may comprise different configurations of adjustment mechanisms without deviating from the teachings herein. Some embodiments may not comprise one or more of height-adjustment mechanism 135, pitch or yaw adjustments mechanisms of crossbar-coupling mechanism 129, or placement-adjustability functions of reflector-coupling mechanisms 133.

Because different vehicles may require different placements and distances for successful calibration, target structure 100 further comprises a number of functions useful for determining the height of the reflectors 131, and the distance between the reflectors 131 and a reference point related to the vehicle. In the depicted embodiment, detachably coupled to crossbar member 127 is a vertical range-finder 137 operable to determine the vertical height of a predetermined point on reflectors 131 from the surface upon which target structure 100 rests. In some embodiments, vertical range-finder 137 may be configured to determine the height of a predetermined point on reflectors 131 from top surface 107. In the depicted embodiment, vertical range-finder 137 comprises a laser range-finder, but other embodiments may comprise a tape measure, ruler, yardstick, sonic range-finder, fixed-length cable, fixed-length rod, or any other equivalent embodiment known to one of ordinary skill in the art. In the depicted embodiment, vertical range-finder 137 is disposed at one end of crossbar member 127, but other embodiments may comprise other arrangements. In the depicted embodiment, detachably coupled to crossbar member 127 is a horizontal range-finder 139 operable to determine the distance of a predetermined point on reflectors 131 from a reference point disposed in a substantially-horizontal direction from reflectors 131. In the depicted embodiment, horizontal range-finder 139 comprises a laser range-finder, but other embodiments may comprise a tape measure, ruler, yardstick, sonic range-finder, fixed-length cable, fixed-length rod, or any other equivalent embodiment known to one of ordinary skill in the art. In the depicted embodiment, horizontal range-finder 139 is disposed at one end of crossbar member 127, but other embodiments may comprise other arrangements.

All of reflectors 131 in the depicted embodiment are functionally identical. However, each is depicted with additional identifiers (e.g., 131a, 131b) in order to clarify the drawings herein. Some embodiments may comprise non-identical configurations of reflectors 131. All of reflector coupling mechanisms 133 in the depicted embodiment are functionally identical. However, each is depicted with additional identifiers (e.g., 133a, 133b) in order to clarify the drawings herein. Some embodiments may comprise non-identical configurations of reflector-coupling mechanisms 133.

Figure 2:
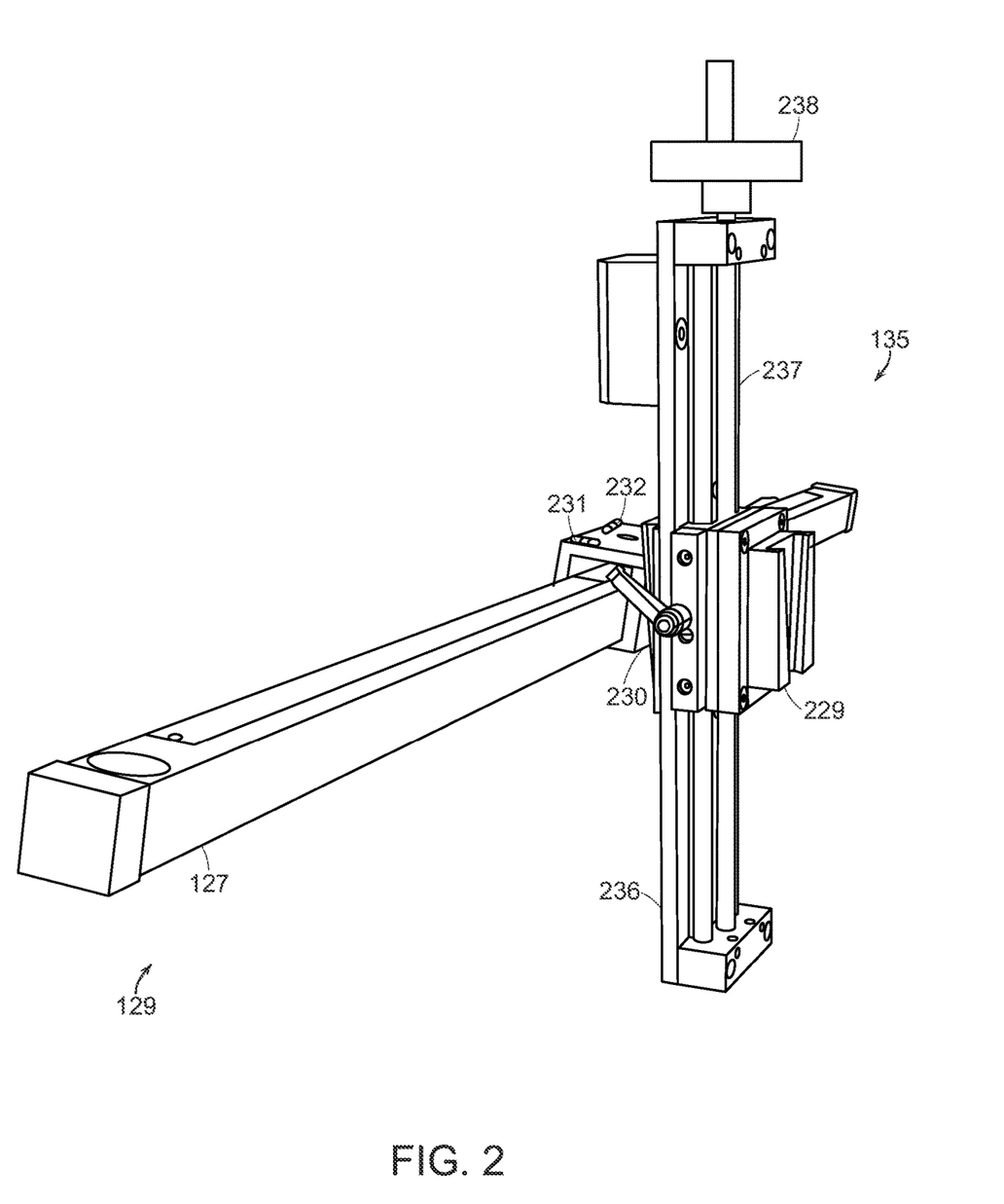
FIG. 2 is a view of an attachment and adjustment mechanism of a crossbar assembly in a target apparatus.

FIG. 2 provides an alternative view of crossbar-coupling mechanism 129 and other features of target structure 100 useful in adjusting the placement of reflectors 131 (see FIG. 1). Crossbar-coupling mechanism 129 comprises a mount 229 operable to detachably couple crossbar member 127 to extensible support member 121. Crossbar-coupling mechanism 129 further comprises an angular-adjustment mechanism 230 operable to finely-adjust the pitch and tilt of crossbar member 127. A pitch indicator 231 and tilt indicator 232 are operable to measure the pitch and tilt of crossbar member 127, so that a user may accurately position crossbar member 127. In the depicted embodiment, pitch indicator 231 is a spirit level, but other embodiments may comprise a digital level, an angle meter, a protractor, a slope gauge, or any other alternative equivalent known to one of ordinary skill in the art without deviating from the teachings disclosed herein. In the depicted embodiment, tilt indicator 232 is a spirit level, but other embodiments may comprise a digital level, an angle meter, a protractor, a slope gauge, or any other alternative equivalent known to one of ordinary skill in the art without deviating from the teachings disclosed herein.

Crossbar-coupling mechanism 129 also comprises height-adjustment mechanism 135. Height-adjustment mechanism 135 is comprised of a height-adjustment frame 236 coupled to mount 229, which frames a height-adjustment spindle 237. Height-adjustment spindle 237 comprises a threaded rod in operable contact with height-adjustment frame 236, wherein the threads of height-adjustment spindle 237 are operable to shift the position of angular-adjustment mechanism 230, crossbar member 127, and the components coupled thereto along a substantially vertical axis with respect to mount 229. In the depicted embodiment, turning the height-adjustment spindle 237 may be accomplished using spindle knob 238. Other embodiments may comprise other forms of height-adjustment mechanism 135, such as a telescoping mechanism, a folding mechanism, a collapsing mechanism, an extension mechanism, or any other extension mechanism known to one of ordinary skill in the art without deviating from the teachings disclosed herein.

Figure 3:
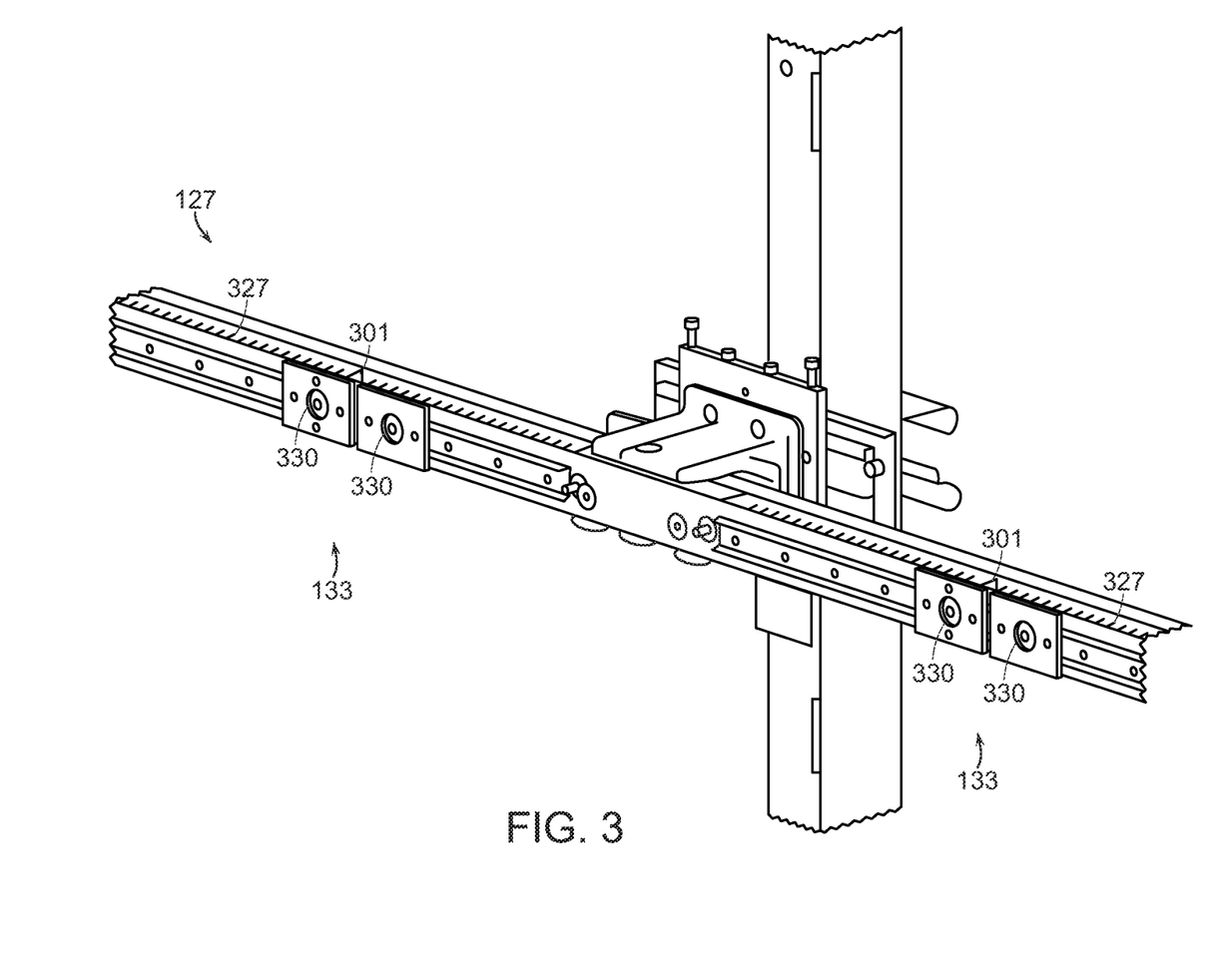
FIG. 3 is a close-up view of magnetic coupling mechanisms of the crossbar assembly of FIG. 2.

FIG. 3 is a close-up view of a number of reflector-coupling mechanisms 133. Each reflector-coupling mechanism 133 is operably coupled to crossbar member 127 such that its position may be adjustably-disposed along the length of crossbar member 127. In the depicted embodiment, the operable coupling is achieved using a sliding function, but other embodiments may comprise other configurations. In some embodiments, the operable coupling may further comprise a locking function in order to prevent undesired motion of the reflector-coupling mechanism 133 along crossbar member 127 during a calibration procedure. The particular placement of the reflector 131 along crossbar member 127 is provided by a placement indicator 301. In the depicted embodiment, placement indicator 301 is aligned with the horizontal center-point of a coupled reflector 131, but other embodiments may comprise other configurations. In the depicted embodiment, the placement indicator 301 shows the linear placement of the associated reflector 131 along crossbar member 127 using a linear measurement marking 327. In the depicted embodiment, linear measurement marking 327 comprise distance measurements printed directly on crossbar member 127, but other embodiments may comprise measurement etchings, a measuring tape or ruler affixed to crossbar member 127, a set of specialized symbols indicating placement measurements, or any other alternative equivalent known to one of ordinary skill in the art without deviating from the teachings disclosed herein. Some embodiments may comprise other forms of distance measurement to determine the placement of a reflector 131, such as an optical range-finder, a sonic range-finder, a measuring tape, a delineated cable, a delineated rod, or any other alternative equivalent known to one of ordinary skill in the art without deviating from the teachings disclosed herein.

In the depicted embodiment, reflector-coupling mechanism 133 further comprises a number of magnetic settings 330 operable to detachably couple a reflector 131 to the reflector-coupling mechanism 133. Magnetic settings 330 comprise a magnet element having a set-pin fitting, the magnet element having sufficient magnetic field to hold the weight of reflector 131 in combination with the rest of the number of magnetic settings 330. In the depicted embodiment, reflector 131 further comprises a set-pin comprised of a ferromagnetic material, operable to fit within the set-pin fitting of magnetic setting 330. In the depicted embodiment, two magnetic settings 330 are used having a particular configuration to which a corresponding configuration of ferromagnetic set-pins are disposed upon a reflector 131. Some embodiments may comprise a different number of magnetic settings 330. Some embodiments may comprise a different configuration of a magnetic settings 330, such as a different number of set-pin fittings including some embodiments without set-pin fittings. Some embodiments may detachably couple a reflector 131 to the reflector-coupling mechanism 133 using other configurations, such as a screw, a bolt, a tie, a latch, a clasp, a non-magnetic set-pin configuration, a specialized connector, or any other coupling configuration known to one of ordinary skill in the art without deviating from the teachings disclosed herein.

Figure 4:
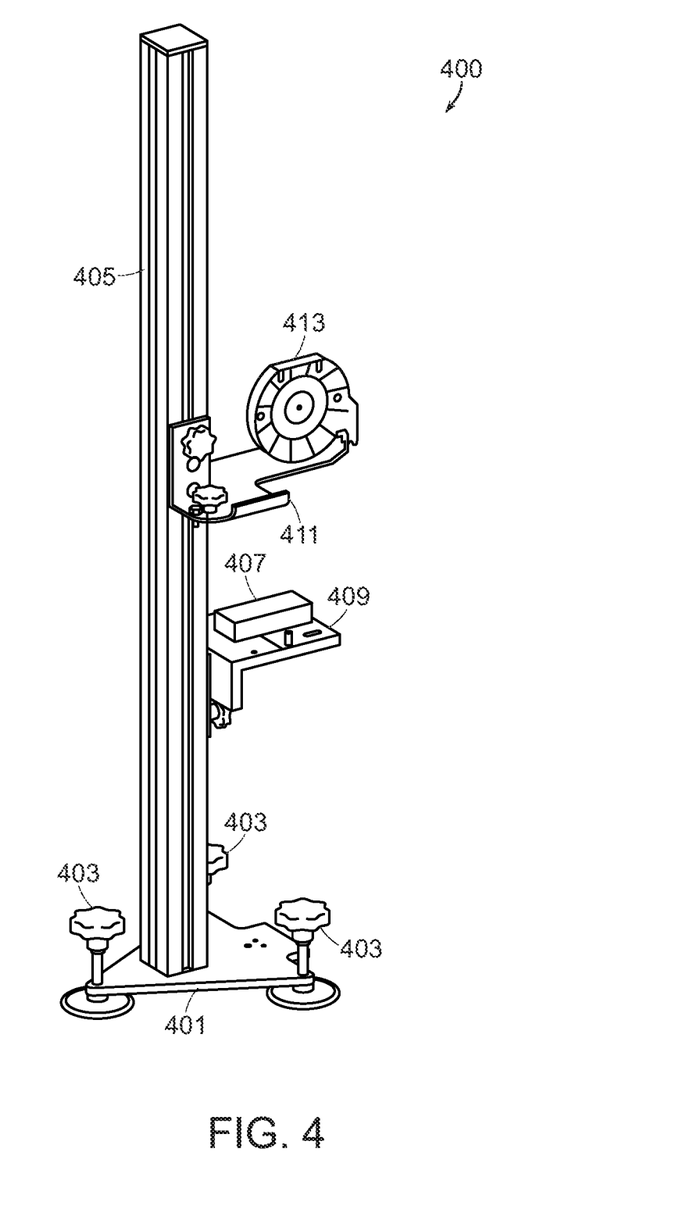
FIG. 4 is a view of an alignment apparatus for use in vehicle sensor calibration.

FIG. 4 depicts an alignment structure 400 operable as part of a vehicle calibration apparatus. Alignment structure 400 is operable to provide a reference for the placement of target structure 100 with respect to the vehicle requiring sensor calibration. Alignment structure 400 comprises a stability member 401 disposed within a plane substantially parallel to the surface upon which the alignment structure 400 rests. Stability member 401 may comprise a number of stability member feet 403 which may be height-adjustable to improve stability of the alignment structure 400 on uneven surfaces. Extending in a substantially vertical direction that is substantially perpendicular to the plane of stability member 401 is a vertical alignment member 405.

A center-seeking instrument 407 operable to determine the center-point of a wheel of a vehicle (not shown) is operably coupled to vertical alignment member 405. In the depicted embodiment, center-seeking instrument 407 comprises a laser measurement tool, but other embodiments may comprise a tape measure, optical alignment tool, or any other equivalent alternative known to one of ordinary skill. In some embodiments, center-seeking instrument 407 may be detachably coupled to alignment structure 400. In some embodiments, center-seeking instrument 407 may be adjustably-positioned linearly along the length of vertical alignment member 405 to maximize compatibility with a range of vehicles having different configurations. Some embodiments may not comprise adjustable-position functions.

Center-seeking instrument 407 further comprises a center-seeking level 409 operable to ensure that the center of the wheel is found in a straight line, thus ensuring that the placement of the alignment structure 400 is accurate. In the depicted embodiment, center-seeking level 409 is a spirit level, but other embodiments may comprise a digital level, an angle meter, a protractor, a slope gauge, or any other alternative equivalent known to one of ordinary skill in the art without deviating from the teachings disclosed herein. The angle of center-seeking instrument 407 may be adjusted by arranging the configurations of stability member feet 403. Some embodiments may comprise other adjustment mechanisms.

An alignment bracket 411 operable to determine placement of the alignment structure 400 in relation to the wheel of a vehicle (not shown) is operably coupled to vertical alignment member 405. Alignment bracket 411 further comprises an alignment target 413 operable to provide a target structure 100 a reliable reference point outside the body of the vehicle for determining proper placement of the target structure 100. In the depicted embodiment, angle bracket 411 may be adjustably-positioned linearly along the length of vertical alignment member 405 to maximize compatibility with a range of vehicles having different configurations. Some embodiments may not comprise adjustable-position functions.

Figure 5:
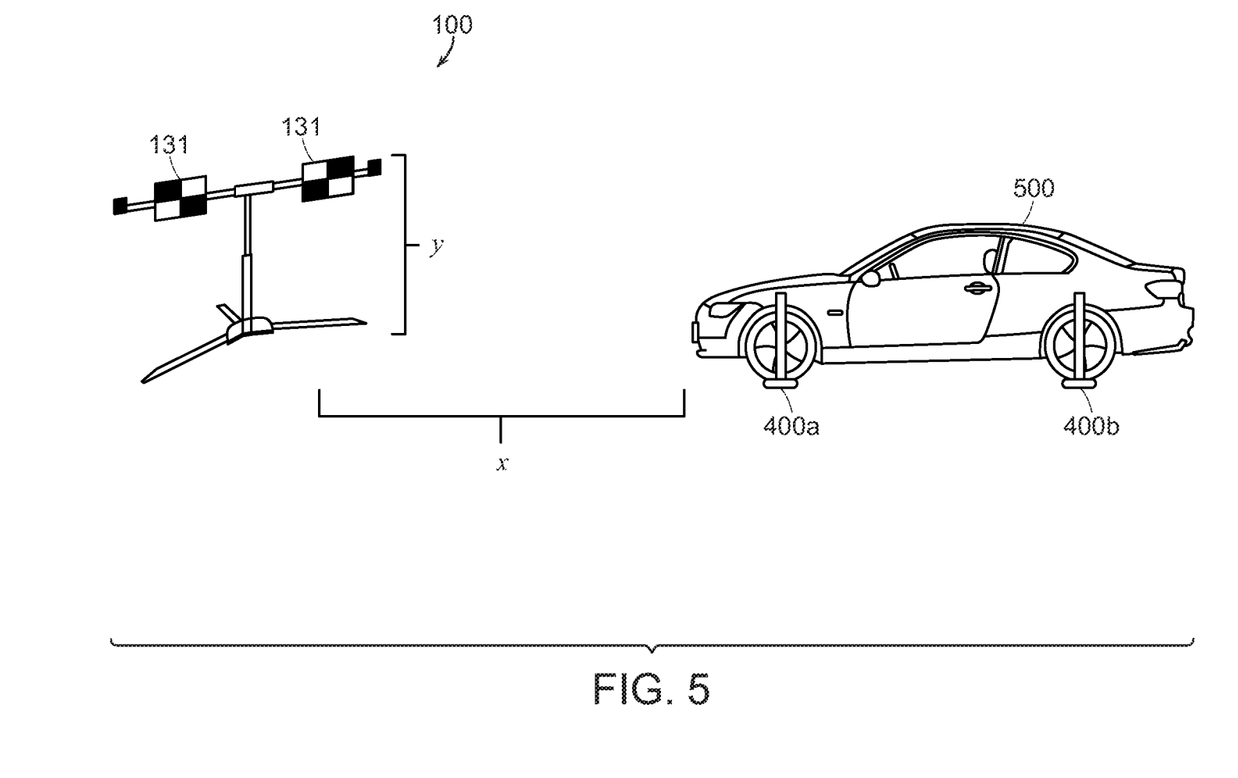
FIG. 5 is a diagrammatic illustration of a vehicle sensor calibration apparatus in use during a sensor calibration.

FIG. 5 illustrates the use of a calibration apparatus comprising the target structure 100 (see FIG. 1) and alignment structure 400 (see FIG. 4) during the calibration process for sensors of a vehicle 500. During calibration, alignment structure 400 is positioned at an appropriate position in relation to vehicle 500 as described above with respect to FIG. 4. In the depicted embodiment, alignment structure 400 is positioned near a front wheel of vehicle 500, but other embodiments may comprise other positions without deviating from the teachings herein. After alignment structure 400 is positioned, target structure 100 is positioned in relation to alignment structure 400 such that a reflector 131 (see FIG. 1) is at a proper distance and angle from one or more of the sensors of the vehicle. In the depicted embodiment, a reflector 131 is in proper position when it is at a horizontal distance x from alignment target 413 (see FIG. 4) when parallel to alignment target 413 and a vertical distance y from the top surface 107 (see FIG. 1). When in the designated position, reflectors 131 provide a proper reference point for one or more sensors of vehicle 500. Other embodiments may comprise alternative arrangements, and in practice the particular arrangements required of the calibration apparatus will be determined by the requirements and arrangements of sensors within vehicle 500. Different vehicles may require different arrangements of the calibration apparatuses.

Figure 6A:
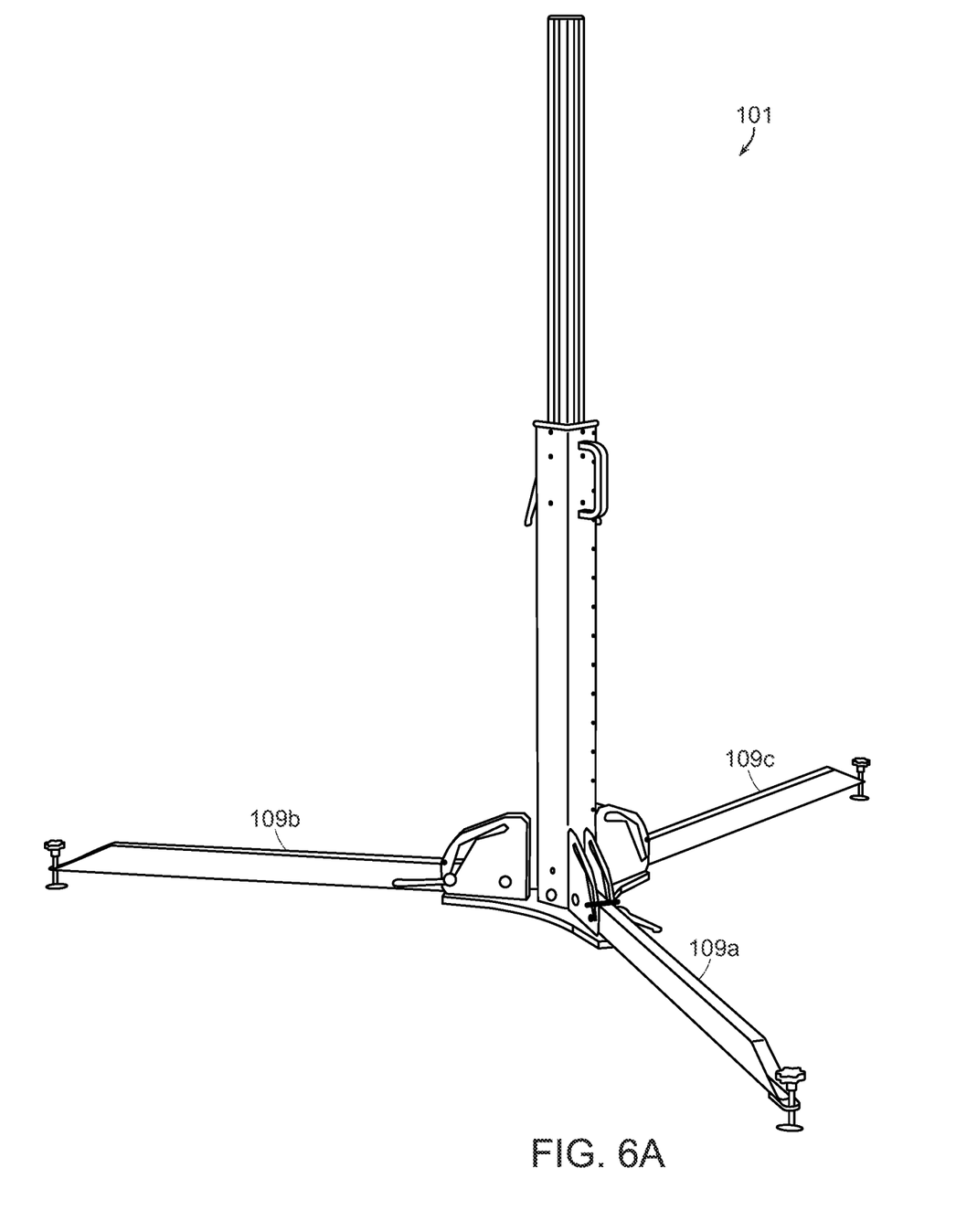
FIG. 6a-6f provide different views of a freestanding assembly portion of the target apparatus of FIG. 1.
Figure 6B:
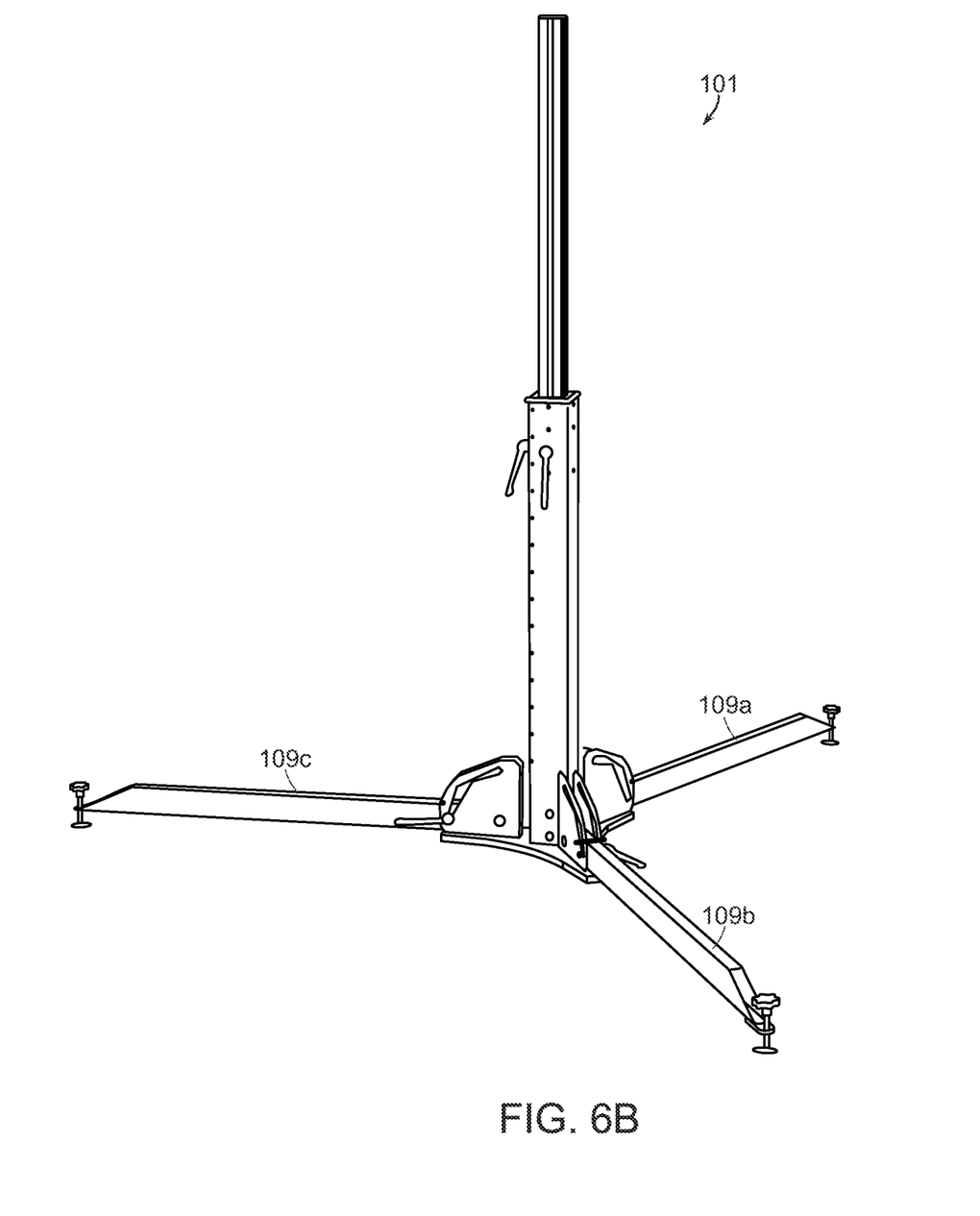
Figure 6C:
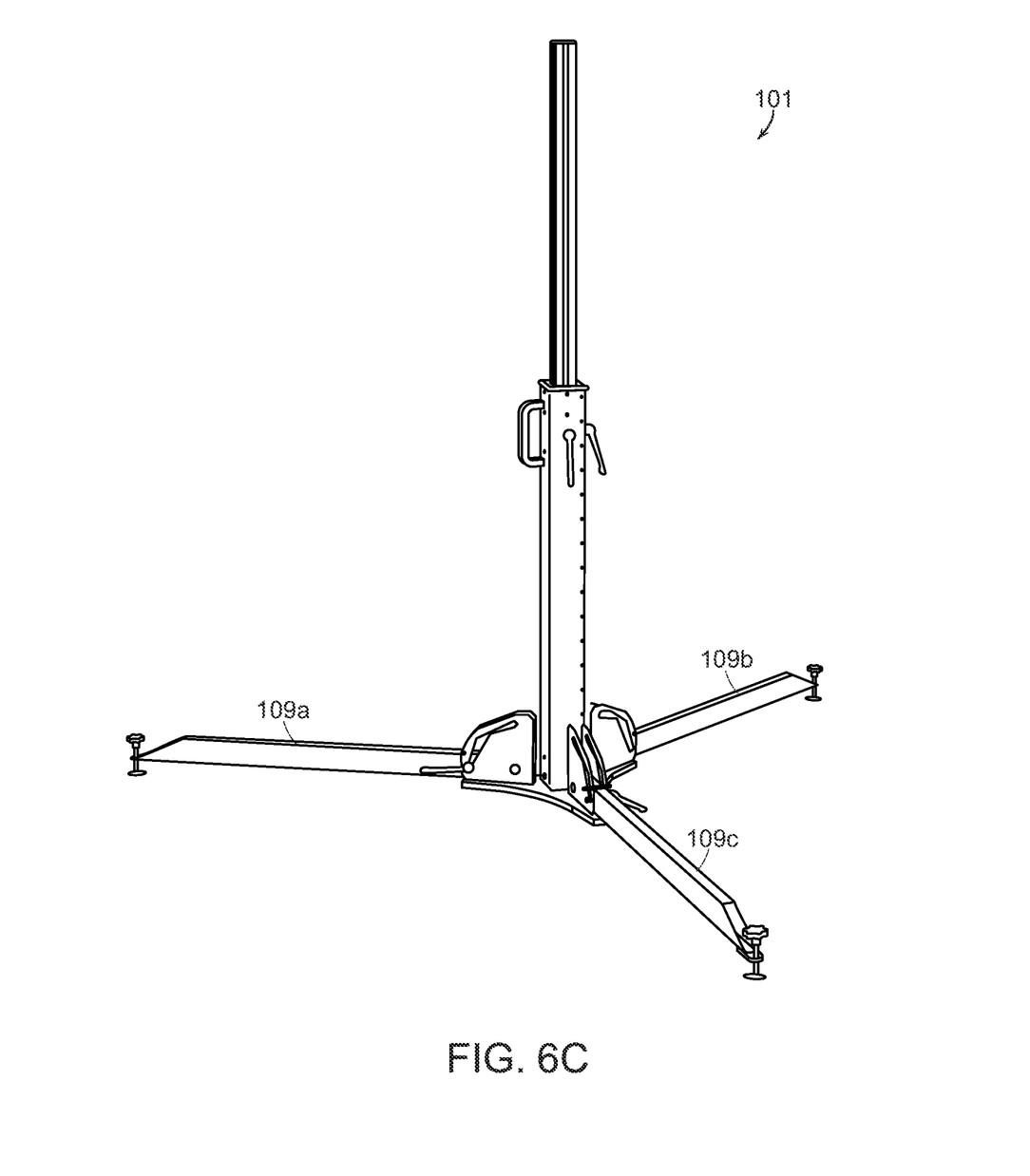
Figure 6D:
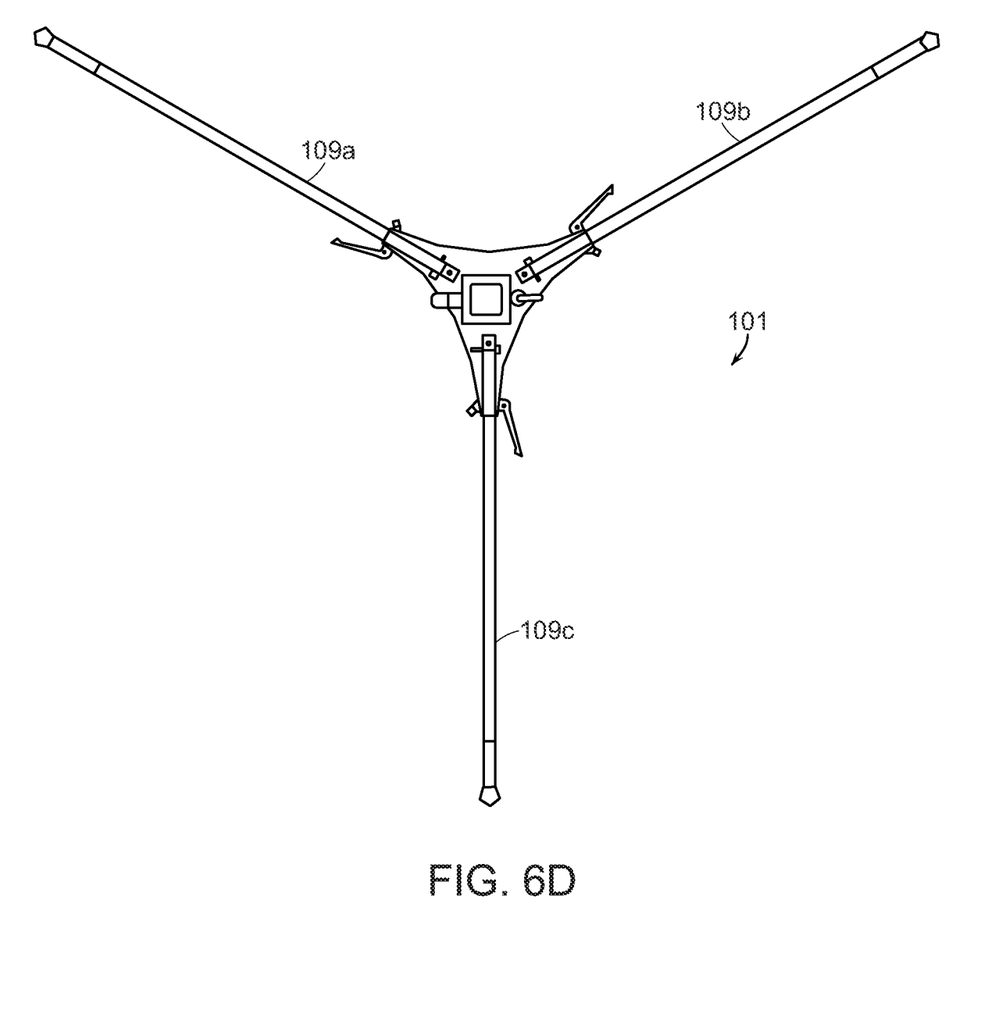
Figure 6E:
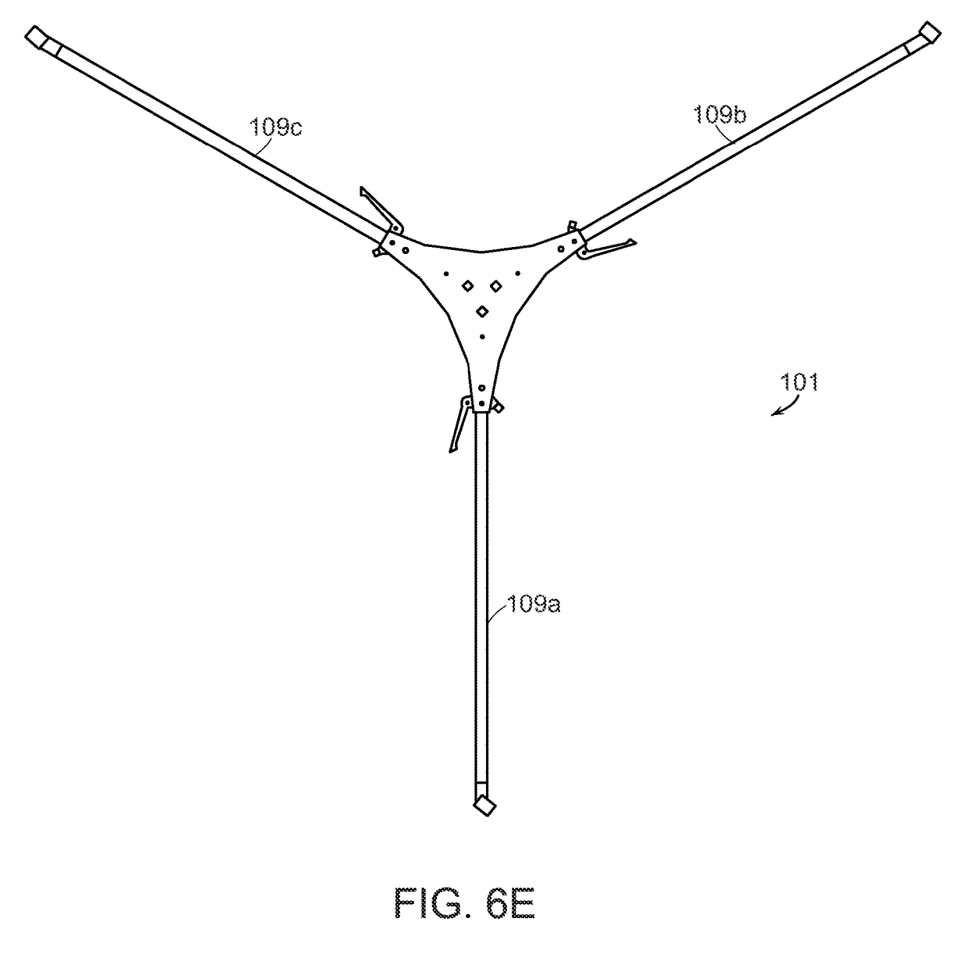
Figure 6F:
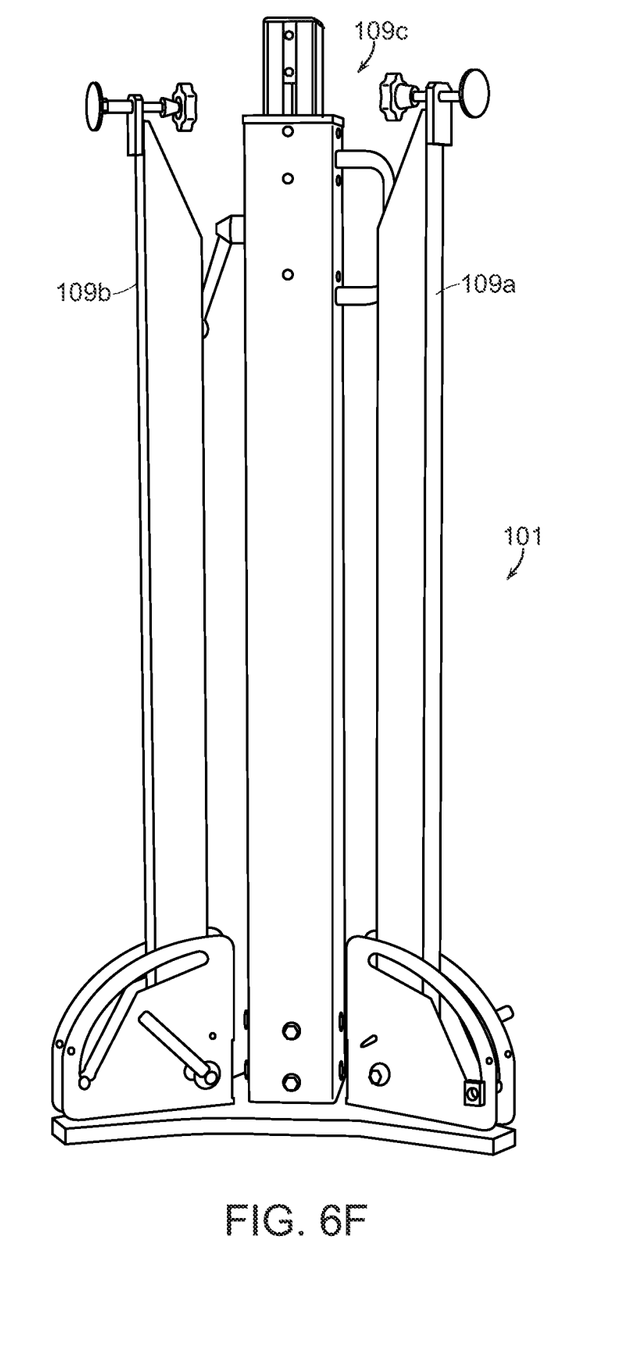

FIG. 6a-6f provide illustrations of one particular contemplated embodiment of freestanding assembly 101 of a target structure 100 (see FIG. 1). FIG. 6a-c show isometric views of the freestanding assembly 101 at different angles while each of legs 109 is in a first position. FIG. 6d shows a top-down view of freestanding assembly 101 with each of legs 109 in the first position. FIG. 6e shows a bottom-up view of freestanding assembly 101 with each of legs 109 in the first position. FIG. 6f shows an isometric view of freestanding assembly 101 with each of legs 109 in a second position. In each of FIG. 6a-6f, each of legs 109 are denoted as one of legs 109a, 109b, or 109c in order to help illustrate the orientation of the drawing.

Figure 7A:
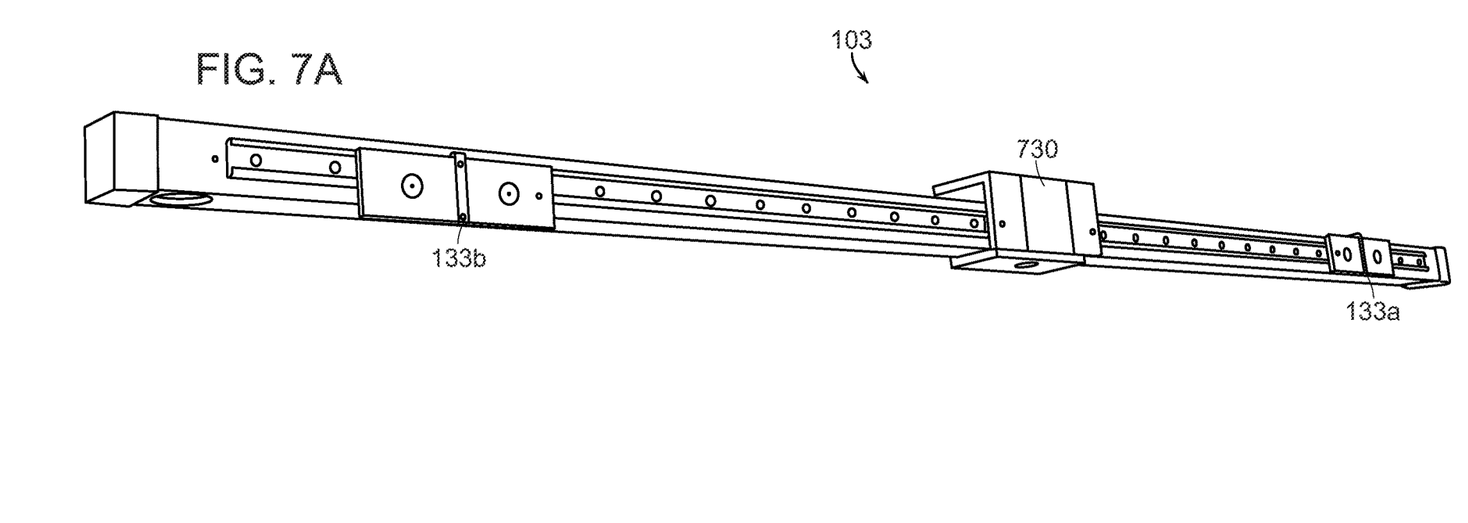
FIG. 7a-7b provide different views of a crossbar assembly operable for coupling to a target assembly.
Figure 7B:
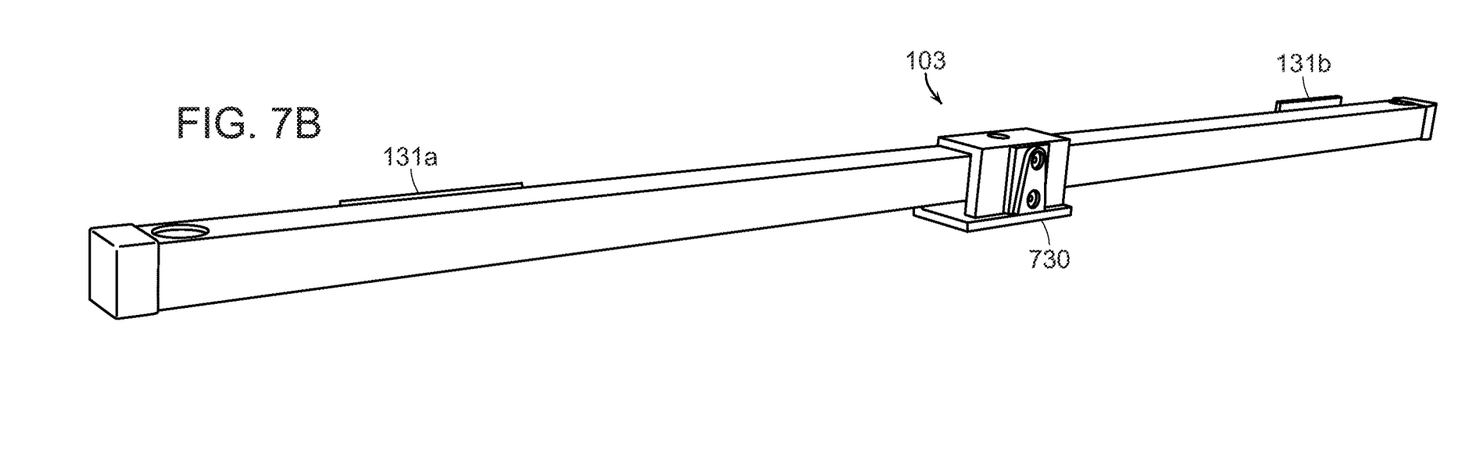

FIG. 7a-7b provide illustrations of one particular contemplated embodiment of crossbar assembly 103 of a target structure 100 (see FIG. 1). FIG. 7a-b show isometric views of the crossbar assembly 103 at different angles. In each of FIG. 7a-7b, each of reflectors 131 are denoted as one of reflector 131a, 131b in order to help illustrate the orientation of the drawing.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope, of the disclosure as claimed. The features of various implementing embodiments may be combined to form further embodiments of the disclosed concepts.

What is claimed is:

1. An optical sensor calibration target apparatus comprising:
   a base plate having a top surface;
   a number of legs connected to and positional relative to the base plate, the length of the legs being disposed in a direction substantially parallel to the top surface in a first position, the legs in the first position exhibiting radial symmetry with respect to a direction substantially perpendicular to the top surface, the radial symmetry having an order equivalent to the number of legs;
   an upright support member extending from the base plate in a direction substantially perpendicular to the top surface;
   a crossbar member detachably coupled to the upright support member, the crossbar member extending substantially perpendicular to the upright support member when coupled; and
   a number of reflective surface members detachably coupled to the crossbar member, the number of reflective surface members each adjustably disposed along the length of the crossbar member,
   wherein the apparatus is operable for configuration into a compacted arrangement with each of the number of legs arranged in a second position, wherein the crossbar member couples to the upright support member using a connection mechanism that is further operable to make fine adjustments to the tilt and pitch of the crossbar member with respect to the upright support member.

2. The optical sensor calibration target apparatus of claim 1, wherein the number of legs comprises three legs.

3. The optical sensor calibration target apparatus of claim 1, wherein the upright support member is adjustably extendable in the direction substantially perpendicular to the top surface.

4. The optical sensor calibration target apparatus of claim 3, wherein the upright support member is adjustably extendable using a telescoping mechanism.

5. The optical sensor calibration target apparatus of claim 1, wherein the crossbar member further comprises a vertical adjustment mechanism operable to make fine adjustments to the vertical position of the crossbar member in relation to the upright support member when the crossbar member is coupled to the upright support member.

6. The optical sensor calibration target apparatus of claim 1, wherein the second position is characterized by a leg being linearly disposed in a direction substantially perpendicular to the top surface.

7. The optical sensor calibration target apparatus of claim 1, wherein the number of reflective surface members are operable to detachably couple to the crossbar member using a magnetic coupling mechanism having a setting pin.

8. The optical sensor calibration target apparatus of claim 1, wherein each of the number of legs is adjustable using a hinge joint coupled to the top surface of the base plate, each hinge joint configured such that its respective leg is disposed within a plane substantially perpendicular to the top surface when the leg is in the second position.

9. The optical sensor calibration target apparatus of claim 8, wherein the hinge joint of at least one of the number of legs comprises a locking mechanism.

10. The optical sensor calibration target apparatus of claim 1, wherein each of the number of legs further comprises one of:
    a height-adjustable foot structure, each height-adjustable foot structure operable to adjust the height of its respective leg with respect to a surface upon which the sensor calibration apparatus rests when the leg is in the first position, or
    a wheel operable for at least partial contact with a surface upon which the sensor calibration apparatus rests, at least one of the wheels having a locking mechanism.

11. The optical sensor calibration target apparatus of claim 10, wherein each of the number of legs further comprises a height-adjustable foot structure.

12. A sensor calibration target apparatus comprising:
    a base plate having a top surface;
    three legs extendable from the base plate, the legs being disposed in a direction substantially parallel to the top surface when in a first position, each of the legs having a height-adjustable foot structure, each height-adjustable foot structure operable to adjust the height of its respective leg with respect to a surface upon which the sensor calibration apparatus rests when the leg is in the first position;
    an upright support member extending from the base plate in a direction substantially perpendicular to the top surface;
    a crossbar member detachably coupled to the upright support member at substantially a middle area of the crossbar member such that the crossbar member extends substantially perpendicular to the upright support member; and
    a pair of reflective surface members detachably coupled to the crossbar member, the pair of reflective surface members each adjustably disposed along the length of the crossbar member and on opposing sides of the upright support member,
    wherein the apparatus is operable for configuration into a compacted arrangement with each of the number of legs arranged in a second position substantially perpendicular to the base plate and wherein the crossbar member couples to the upright support member using a connection mechanism that is further operable to make fine adjustments to the tilt and pitch of the crossbar member with resect to the upright support member.

13. The sensor calibration target apparatus of claim 12, wherein the three legs exhibit third-order radial symmetry with respect to a direction substantially perpendicular to the top surface when arranged in the first position.

14. The sensor calibration target apparatus of claim 12, wherein the pair of reflective surface members are operable to detachably couple to the crossbar member using a magnetic coupling mechanism having a setting pin.

15. The sensor calibration target apparatus of claim 12, wherein each of the three legs is adjustable using a hinge joint coupled to the top surface of the base plate, each hinge joint configured such that it provides its respective leg a range of motion of from at least the first position to the second position.

16. The sensor calibration target apparatus of claim 15, wherein the hinge joint of each of the number of legs comprises a locking mechanism.

17. An optical sensor calibration apparatus comprising:
a target structure having a base plate with a top surface, a number of legs connected to and positional relative to the base plate, an upright support member extending from the base plate in a direction substantially perpendicular to the top surface, a crossbar member detachably coupled to the upright support member, and a number of reflective surface members detachably coupled to the crossbar member, wherein the legs in a first position are disposed lengthwise in a direction substantially parallel to the top surface and exhibit radial symmetry with respect to a direction substantially perpendicular to the top surface, the crossbar member extends substantially perpendicular to the upright support member when coupled and the number of reflective surface members detachably coupled to the crossbar member and are adjustably disposed along the length of the crossbar member; and a number of alignment structures, each of the alignment structures having a stability member, a vertical alignment member extending from the stability member in a substantially perpendicular direction from the surface upon which the alignment structure rests, and a number of alignment brackets, wherein the target structure is operable for configuration into a compacted arrangement with each of the number of legs arranged in a second position and wherein the crossbar member couples to the upright support member using a connection mechanism that is further operable to make fine adjustments to the tilt and pitch of the crossbar member with respect to the upright support member.

* * * * *